United States Patent
Raghavan et al.

(10) Patent No.: US 9,858,175 B1
(45) Date of Patent: Jan. 2, 2018

(54) METHOD AND SYSTEM FOR GENERATION A VALID SET OF TEST CONFIGURATIONS FOR TEST SCENARIOS

(71) Applicant: Wipro Limited, Bangalore (IN)

(72) Inventors: Girish Raghavan, Chennai (IN); Thamilchelvi Peterbarnabas, Chennai (IN); Deepashree Mohan, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/356,715

(22) Filed: Nov. 21, 2016

(30) Foreign Application Priority Data

Sep. 28, 2016 (IN) .............................. 201641033195

(51) Int. Cl.
  *G06F 9/44* (2006.01)
  *G06F 11/36* (2006.01)

(52) U.S. Cl.
  CPC ............ *G06F 11/3684* (2013.01); *G06F 8/10* (2013.01); *G06F 11/3664* (2013.01)

(58) Field of Classification Search
  CPC ........................................................ G06F 9/44
  USPC ................................................. 717/124–127
  See application file for complete search history.

(56) References Cited

U.S. PATENT DOCUMENTS

| | | |
|---|---|---|
| 6,772,083 B2 | 8/2004 | Muller et al. |
| 7,363,616 B2 | 4/2008 | Kalyanaraman |
| 8,319,493 B2 | 11/2012 | Takahashi et al. |
| 8,681,105 B2 | 11/2014 | Quitter, Jr. |
| 9,098,630 B2 | 8/2015 | Funke et al. |
| 2006/0010426 A1 | 1/2006 | Lewis et al. |
| 2006/0198501 A1* | 9/2006 | Marche ................... G10L 15/22 379/88.17 |
| 2008/0172659 A1* | 7/2008 | Yu ............................. G06F 8/71 717/139 |
| 2009/0006897 A1 | 1/2009 | Sarsfield |
| | (Continued) | |

FOREIGN PATENT DOCUMENTS

EP         1 890 235         2/2008

OTHER PUBLICATIONS

Extended European Search Report issued in the European Patent Office in counterpart European Application No. 16207202.9, dated Jul. 19, 2017, 7 pages.

*Primary Examiner* — Jae Jeon

(74) *Attorney, Agent, or Firm* — Finnegan, Henderson, Farabow, Garrett & Dunner, LLP

(57) ABSTRACT

The present disclosure is related in general to software testing and a method and a system for generating a valid set of test configurations for test scenarios. A test configuration generation system retrieves one or more test parameters from each of one or more test scenarios associated with a corresponding requirement and a requirement criticality. Further, the test configuration generation system identities data values corresponding to each of the one or more test parameters. Further, it generates a valid set of test configurations for each test scenario based on requirement risk and eliminates one or more invalid test configuration combinations detected and finally a valid set of test configurations for each test scenario is generated. The present disclosure ensures right coverage with right set of configurations that can be executed within the limited time available and reduces 80% of manual efforts in generating the test configurations.

18 Claims, 7 Drawing Sheets

(56) References Cited

U.S. PATENT DOCUMENTS

2009/0168657 A1\* 7/2009 Puri ..................... G06F 11/263
                                                    370/248
2014/0165043 A1\* 6/2014 Pasala ................ G06F 11/3684
                                                    717/124

\* cited by examiner

METHOD AND SYSTEM FOR GENERATION A VALID SET OF TEST CONFIGURATIONS FOR TEST SCENARIOS

TECHNICAL FIELD

The present subject matter relates generally to software testing, and more particularly, but not exclusively to a method and a system for generating a valid set of test configurations for test scenarios.

BACKGROUND

Generally, for easy maintenance of test scenarios, the test scenarios are separated from test data in a test management system. Integration of the test scenarios and the test data is performed manually by association of test data with test parameters in the test scenarios to generate test configurations. It becomes difficult to generate test configurations for larger volumes of data and multiple parameters in test scenarios. Manual activity to generate the test configurations consumes lot of time and could take up to 30 to 40% of the planning effort for a test cycle. As an example, consider testing for a Global Insurance company. The quote process may have to be tested across several geographical regions for different Products. Traditionally, the test scenario for the quote process created may have to be configured with a large number of data combinations for each region and product under test which almost consumes 30-40% of overall test planning effort.

Existing techniques generate test cases based on input data to User Interface (UI) action and elements mapping, for each input data, UI elements and sub elements are identified and test cases are generated. Further, some of the existing techniques generate the one or more test configurations without any optimization involved. As a result of which, identifying the correct test configurations and discarding the invalid ones out of all the existing test data combinations is a tedious process and involves a lot of time. Further, handling huge volumes of data becomes difficult. Also, when a new requirement arises, testing only updated test configurations based on the requirement becomes difficult. Therefore the quality of assessing the impact and applicability of the change due to the requirement is not good and may lead to requirement risk.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for generating a valid set of test configurations for test scenarios. The method comprising retrieving by a test configuration generation system, one or more test parameters from each of one or more test scenarios received from one or more data sources. Each of the one or more test scenarios is associated with a corresponding requirement and a requirement criticality. Further, the test configuration generation system identifies one or more data values corresponding to each of the one or more test parameters and storing the one or more data values in a first data set. Furthermore, the test configuration generation system generates one or more test configurations based on the one or more test parameters, the corresponding requirement and the requirement criticality of each of the one or more test scenarios and each of the one or more data values corresponding to the one or more test parameters. Upon generating the one or more test configurations, the test configuration generation system detects one or more invalid test configuration combinations from the one or more test configurations by correlating the one or more test parameters selected by a user and each of the one or more data values corresponding to the one or more test parameters. Finally, the test configuration generation system replaces the one or more invalid test configuration combinations from the one or more test configurations with a valid test configuration combination to generate a valid set of test configurations for each of the one or more test scenarios.

Further, the present disclosure comprises a test configuration generation system for generating a valid set of test configurations for test scenarios. The test configuration generation system comprises a processor and a memory communicatively coupled to the processor. The memory stores the processor-executable instructions, which, on execution, causes the processor to retrieve one or more test parameters from each of one or more test scenarios received from one or more data sources, wherein each of the one or more test scenarios is associated with a corresponding requirement and a requirement criticality. Further, the processor identifies one or more data values corresponding to each of the one or more test parameters and stores the one or more data values in a first data set. Furthermore, the processor generates one or more test configurations based on the one or more test parameters, the corresponding requirement and the requirement criticality of each of the one or more test scenarios and each of the one or more data values corresponding to the one or more test parameters. Upon generating the one or more test configurations, the processor detects one or more invalid test configuration combinations from the one or more test configurations by correlating the one or more test parameters selected by a user and each of the one or more data values corresponding to the one or more test parameters. Finally, the processor replaces the one or more invalid test configuration combinations from the one or more test configurations with a valid test configuration combination to generate a valid set of test configurations for each of the one or more test scenarios.

In another embodiment, a non-transitory computer-readable storage medium for assistive photography is disclosed, which when executed by a computing device, causes the computing device to perform operations including retrieving one or more test parameters from each of one or more test scenarios received from one or more data sources, wherein each of the one or more test scenarios is associated with a corresponding requirement and a requirement criticality. Further, the operations further include identifying one or more data values corresponding to each of the one or more test parameters and stores the one or more data values in a first data set. Furthermore, the operations include generating one or more test configurations based on the one or more test parameters, the corresponding requirement and the requirement criticality of each of the one or more test scenarios and each of the one or more data values corresponding to the one or more test parameters. Upon generating the one or more test configurations, the operations include detecting one or more invalid test configuration combinations from the one or more test configurations by correlating the one or more test parameters selected by a user and each of the one or more data values corresponding to the one or more test parameters. Finally, the operations include replacing the one or more invalid test configuration combinations from the one or more test configurations with a valid test configuration combination to generate a valid set of test configurations for each of the one or more test scenarios.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
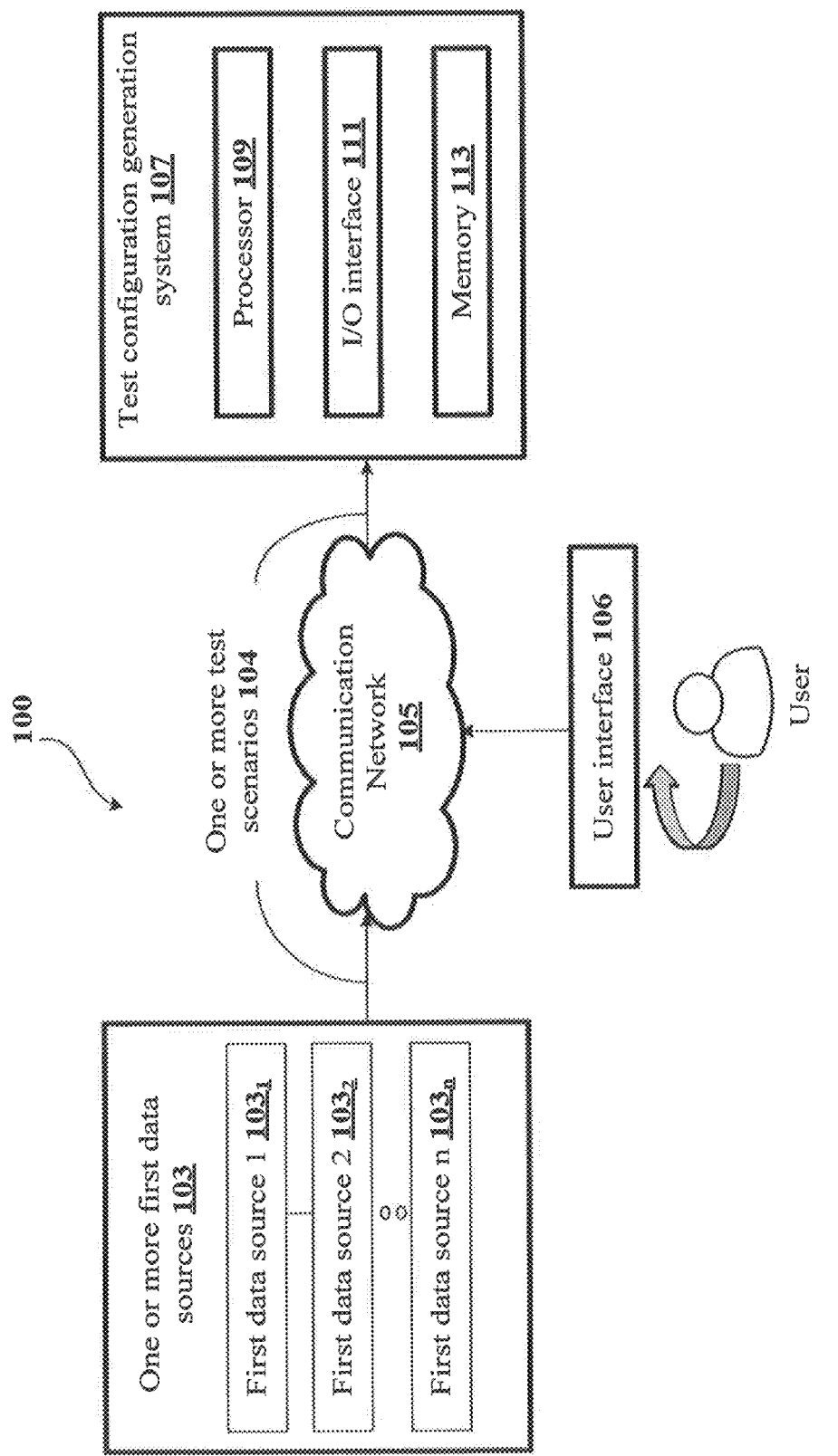
FIG. 1 shows an exemplary architecture for generating a valid set of test configurations for test scenarios in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating a valid set of test configurations for test scenarios. The method comprises retrieving by a test configuration generation system, one or more test parameters from each of one or more test scenarios received from one or more data sources. As an example, consider an insurance company. For the insurance company, "insurance policy creation" for creating an insurance policy is a test scenario. Further, the one or more parameters associated with the test scenario "insurance policy creation" may be Uniform Resource Locator (URL), Credentials, Customer_Type, Smoker Status, Product_Type etc. The "URL" is the test parameter that holds links for the various test environments such as System Testing (SIT), User Acceptance testing (UAT) etc. Similarly, "Credentials" is the test parameter that holds data related to valid and invalid credentials used for logging in. Further, "Customer_Type" is the parameter that holds data related to different types of customers. "Smoker status" is a test parameter that holds data that specifies smoking status of the user. "Product type" holds data related to type of product that the user can choose from.

Each of the one or more test scenarios is associated with a corresponding requirement and a requirement criticality. As an example, the test scenario "insurance policy creation" is associated with a Requirement 1 and a requirement criticality "High". The Requirement 1 may include, but not limited to, requirements such as prompting user login and enter details and generating an insurance quote based on the details provided by the user. The requirement criticality gives an idea about weightage of a certain requirement when compared to other requirements. Based on the requirement criticality, the requirements with more weightage can be prioritized that reduces any risks related to the requirements. Further, the test configuration generation system identifies one or more data values corresponding to each of the one or more test parameters and storing the one or more data values in a first data set. The one or more data values may be added or deleted by the user based on the requirement.

Furthermore, the test configuration generation system generates one or more test configurations based on the one or more test parameters, the corresponding requirement and the requirement criticality of each of the one or more test scenarios and each of the one or more data values corresponding to the one or more test parameters. Since the one or more test configurations are generated mainly based on the requirement criticality, they are considered to be the most optimized set of one or more test configurations. Upon generating the one or more test configurations, the test configuration generation system detects one or more invalid test configuration combinations from the one or more test configurations by correlating the one or more test parameters selected by a user and each of the one or more data values corresponding to the one or more test parameters. Finally, the test configuration generation system replaces the one or more invalid test configuration combinations from the one or more test configurations with a valid test configuration combination to generate a valid set of test configurations for each of the one or more test scenarios. The test configuration generation system reduces the manual efforts of eliminating the invalid test configuration combinations by 80%.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating a valid set of test configurations for test scenarios in accordance with some embodiments of the present disclosure.

The architecture 100 comprises one or more data sources, data source 1 $103_1$ to data source n $103_n$ (collectively referred to as one or more data sources 103), a communication network 105, a user interface 106 and a test configuration generation system 107. As an example, the one or more data sources 103 may include, but not limited to, a test management system that comprises one or more test scenarios 104. Each of the one or more test scenarios 104 are mapped according to requirements for development of an application. In an embodiment, the one or more test scenarios 104 may be present in the test management system. Alternatively, the test management system obtains the one or more test scenarios 104 in association with one or more test management tools or one or more process modeling tools. As an example, the one or more test management tools may include, but not limited to, Application Lifecycle Management (ALM) and JIRA. As an example, the one or more process modeling tools may include, but not limited to, Architecture of Integrated Information Systems (ARIS) and Visio using tool specific Application Programming Interface (APIs) or standard API's like Representational State Transfer (REST) API. A user associated with the test configuration generation system 107 establishes connection between the test configuration generation system 107 and the one or more data sources 103 through the user interface 106. The test configuration generation system 107 receives the one or more test scenarios 104 from the one or more data sources 103 through a communication network 105. In an embodiment, the communication network 105 may be at least one of wired communication network and wireless communication network.

The test configuration generation system 107 comprises a processor 109, an I/O interface 111 and a memory 113. The I/O interface 111 receives the one or more test scenarios 104 from the one or more data sources 103. Each of the one or more test scenarios 104 is associated with a corresponding requirement and a requirement criticality. In an embodiment, the requirement criticality may be one of "High", "Medium" and "Low". The one or more test scenarios 104 comprise one or more test parameters. Each of the one or more test parameters are place holders which are capable of accepting a range of one or more data values passed to the one or more test parameters.

The processor 109 parses the one or more test scenarios 104 to retrieve the one or more test parameters and stores in the memory 113. Alternatively, the one or more parameters may be provided by the user through the user interface 106. Upon retrieving the one or more parameters, the processor 109 identifies the one or more data values for each of the one or more parameters from the one or more data sources 103. In an embodiment, each of the one or more data values is associated with a data criticality which is retrieved from the one or more data sources 103. The data criticality may be one of "High", "Medium" and "Low". Alternatively, the one or more data values and the data criticality may be provided by the user through the user interface 106. The one or more data values and the corresponding data criticality is stored in the memory 113. Further, the processor 109 generates one or more test configurations based on the one or more test parameters, the corresponding requirement and the requirement criticality of each of the one or more test scenarios 104 and each of the one or more data values corresponding to the one or more test parameters. Upon generating the one or more test configurations, the processor 109 detects one or more invalid test configuration combinations from the one or more test configurations. Finally, if the one or more invalid test configuration combinations are detected, the processor 109 replaces the one or more invalid test configuration combinations with the one or more valid test configuration combinations to generate a valid set of test configurations for each of the one or more test scenarios 104.

Figure 2A:
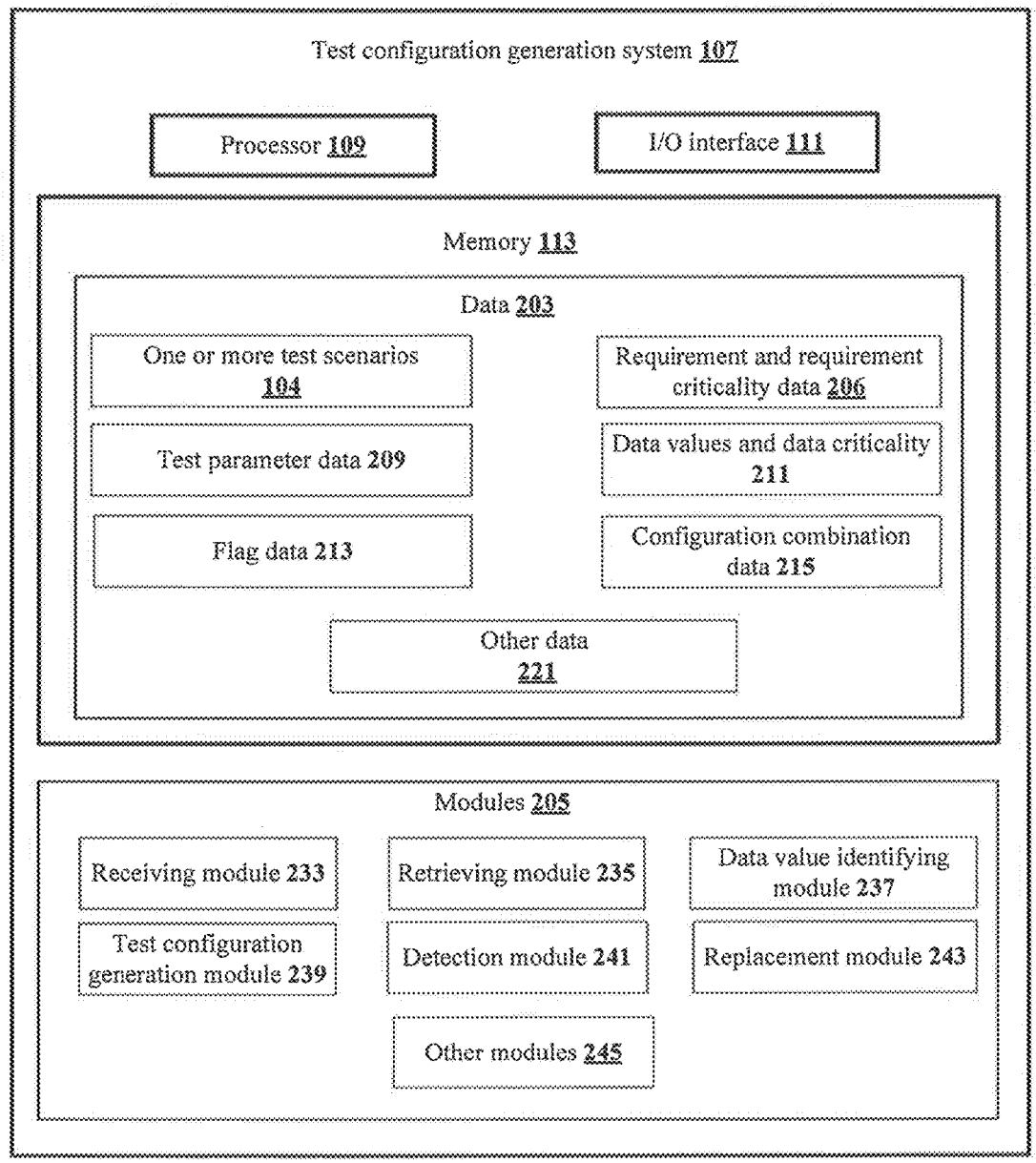
FIG. 2A shows a detailed block diagram of a test configuration generation system for generating a valid set of test configurations for test scenarios in accordance with some embodiments of the present disclosure.

FIG. 2A shows a detailed block diagram of a test configuration generation system for generating a valid set of test configurations for test scenarios in accordance with some embodiments of the present disclosure.

In one implementation, the test configuration generation system 107 receives the one or more test scenarios 104 from one or more data sources 103 associated with the test configuration generation system 107. As an example, the one or more test scenarios 104 received are stored in the memory 113 configured in the test configuration generation system 107 as shown in the FIG. 2A. In one embodiment, data 203 includes one or more test scenarios 104, requirement and requirement criticality data 206, test parameter data 209, data values and data criticality 211, flag data 213, configuration combination data 215 and other data 221. In the illustrated FIG. 2A, modules 205 are described herein in detail.

In one embodiment, the data may be stored in the memory 113 in the form of various data structures. Additionally, the aforementioned data can be organized using data models, such as relational or hierarchical data models. The other data 221 may store data, including temporary data and temporary files, generated by modules 205 for performing the various functions of the test configuration generation system 107.

In an embodiment, the one or more test scenarios 104 are received from the one or more data sources 103 that are in association with one or more test management tools or one or more process modeling tools. Each of the one or more test scenarios 104 may be required for validating functionality of the application under test.

In an embodiment, the requirement and requirement criticality data 206 comprises the requirements for development of the application. Each of the one or more test scenarios 104 are mapped according to the requirements. Further, each requirement is associated with a corresponding requirement criticality. In an embodiment, the requirement criticality may be one of "High", "Medium" and "Low". The requirement and the corresponding requirement criticality may be retrieved from the one or more data sources 103 or provided by a user from a user interface 106.

In an embodiment, the test parameter data 209 comprises one or more test parameters retrieved from the one or more test scenarios 104. Each of the one or more test parameters are place holders which are capable of accepting a range of one or more data values passed to the one or more test parameters.

In an embodiment, the data value and data criticality 211 comprises the one or more data values passed to each of the one or more parameters. Each of the one or more data values is associated with a corresponding data criticality may be one of "High", "Medium" and "Low". The one or more data values and the corresponding data criticality may be either retrieved from the one or more data sources 103 or provided by the user through the user interface 106.

In an embodiment, the flag data 213 comprises data related to flags tagged with each of the one or more data values. The flags tagged with each of the one or more data values may include, but not limited to, a "New" flag and an "Expected" flag. The "New" flag is used to indicate when the one or more data values are newly added. The "New" flag is set to "True" if the one or more data values are provided to the test configuration generation system 107 for a first time. The "New" flag is set to "False" if the one or more data values are already available in the memory 113 of the test configuration generation system 107. The "Expected" flag is used to indicate type of test case flow received from the user based on which the one or more data values are tested. The "Expected" flag is set to "True" if the one or more data values are used for testing a positive flow. The "Expected" flag is set to "False" if the one or more data values are used for testing a negative flow.

In an embodiment, the configuration combination data 215 comprises one or more invalid configuration combinations and one or more valid test configuration combinations. Combination of an irrelevant test parameter and an irrelevant data value generates the one or more invalid configuration combinations. Rest of the combinations other than the invalid configuration combinations having a relevant test parameter and a relevant data value are said to be the one or more valid configuration combinations. An exemplary invalid configuration combination is shown in the below Table 1.

TABLE 1

| Row number | Candidate_type | Date Of Birth (DOB) |
| --- | --- | --- |
| 1. | Group | 25-30 years of age |
| 2. | Individual | Sep. 19, 1993 |

In the above Table 1, "Candidate_Type" and "DOB" are test parameters. In row number 1, a data value passed to the test parameter "Candidate_type" is "Group" and to the test parameter "DOB" is "25-30 years of age". The data values passed to the test parameters in row number 1 indicate the invalid configuration combination as the test parameter "DOB" should have a single data value in the form of a date i.e. in the form of Date (dd)-Month (MM)-Year (YYYY) and not a range of ages. However, for data value "Group", the test parameter "DOB" containing a single value is not possible, as a result of which Row-1 is considered as an invalid configuration combination. In row number 2, a data value passed to the test parameter "Candidate_type" is "Individual" and to the test parameter "DOB" is "19 Sep. 1993". The data values passed to the test parameters in row number 2 indicates a valid configuration combination since the test parameter "DOB" has a single data value in the form of the date and not a range of ages. The one or more invalid configuration combinations are determined by the user which is stored in the memory 113

In an embodiment, the data stored in the memory 113 is processed by the modules 205 of the test configuration generation system 107. The modules 205 may be stored within the memory 113. In an example, the modules 205 communicatively coupled to a processor 109 configured in the test configuration generation system 107, may also be present outside the memory 113 as shown in FIG. 2A and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 233, a retrieving module 235, a data value identifying module 237, a test configuration generation module 239, a detection module 241, a replacement module 243 and other modules 245. The other modules 245 may be used to perform various miscellaneous functionalities of the test configuration generation system 107. It will be appreciated that such aforementioned modules 205 may be represented as a single module or a combination of different modules.

In an embodiment, the receiving module 233 receives the one or more test scenarios 104 from the one or more data sources 103. The one or more data sources 103 may include, but not limited to, a test management system that comprises one or more test scenarios 104.

In an embodiment, the retrieving module 235 retrieves the one or more test parameters from each of the one or more test scenarios 104 received by the receiving module 233. The one or more test parameters are retrieved by parsing the one or more test scenarios 104. As an example, consider an insurance company. For the insurance company, "insurance policy creation" for creating an insurance policy is a test scenario. Further, the one or more parameters associated with the test scenario "insurance policy creation" may be Uniform Resource Locator (URL), Credentials, Customer_Type, Smoker Status, Product_Type etc. The "URL" is the test parameter that holds links for the various test environments such as System Testing (SIT), User Acceptance testing (UAT) etc. Similarly, "Credentials" is the test parameter that holds data related to valid and invalid credentials used for logging in. Further, "Customer_Type" is the parameter that holds data related to different types of customers. "Smoker status" is a test parameter that holds data that specifies smoking status of the user. "Product type" holds data related to type of product that the user can choose from.

Figure 2B:
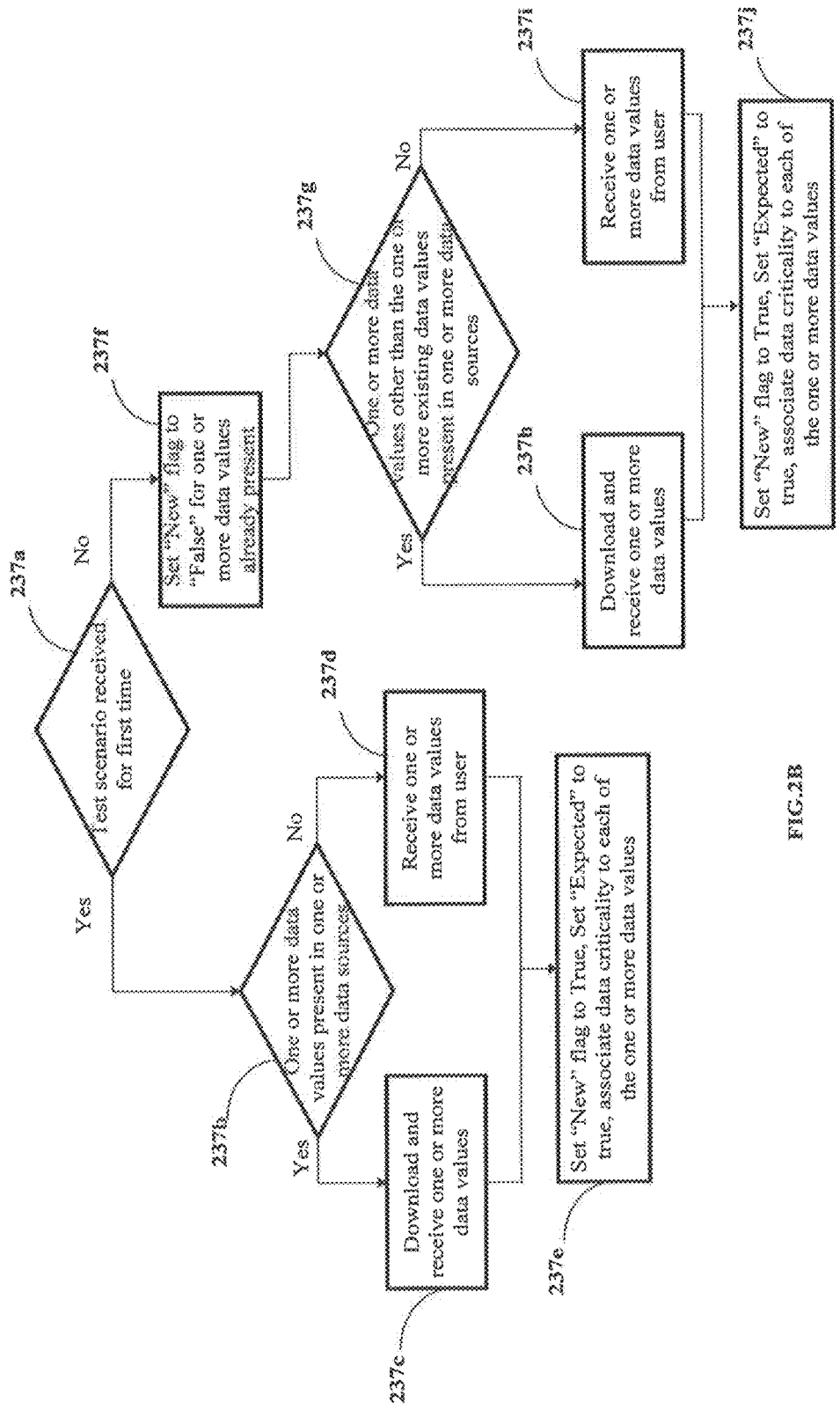
FIG. 2B shows a flowchart illustrating a method for identifying one or more data values corresponding to each of the one or more test scenarios in accordance with some embodiments of the present disclosure.

In an embodiment, the data value identifying module 237 identifies the one or more data values corresponding to each of the one or more test scenarios 104 as illustrated in FIG. 2B.

At block 237a, the data value identifying module 237 checks for a condition to see if the one or more test scenarios 104 are received for a first time. If the one or more test scenarios 104 are received for a first time, the data value identifying module 237 proceeds to block 237b via "Yes". If the one or more test scenarios 104 are not received for a first time, the data value identifying module 237 proceeds to block 237*f* via "No".

At block 237*b*, the data value identifying module 237 checks for a condition to see if the one or more data values corresponding to each of the one or more test parameters are present in the one or more data sources 103. If the one or more data values corresponding to each of the one or more test parameters are present in the one or more data sources 103, the data value identifying module 237 proceeds to block 237*c* via "Yes". If the one or more data values corresponding to each of the one or more test parameters are not present in the one or more data sources 103, the data value identifying module 237 proceeds to block 237*d* via "No".

At block 237*c*, the data value identifying module 237 downloads and receives the one or more data values corresponding to each of the one or more test parameters from the one or more data sources 103 and proceeds to block 237*e*.

At block 237*d*, the data value identifying module 237 receives the one or more data values corresponding to each of the one or more test parameters from the user and proceeds to block 237*e*.

At block 237*e*, the data value identifying module 237 sets the "New" flag tagged with each of the one or more data values to "True". In an embodiment, if the one or more test scenarios 104 are received by the receiving module 233 for the first time, then the one or more data values associated with the each of the one or more test parameters retrieved from the one or more test scenarios 104 are deemed to be new. Therefore, the "New" flag tagged with each of the one or more data values is set to "True" to indicate that the one or more data values are new. Further, the data value identifying module 237 sets the "Expected" flag tagged with each of the one or more data values to "True" by default. In an embodiment, the user can set the "Expected" flag to "False" when needed. Further, the data value identifying module 237 receives the corresponding data criticality associated with each of the one or more data values from the one or more data sources 103 if the corresponding data criticality is present in the one or more data sources 103 and the user may modify the received data criticality, if required. Alternatively, if the corresponding data criticality is not present in the one or more data sources 103, the user provides the corresponding data criticality through the user interface 106.

At block 237*f*, the data value identifying module 237 sets the "New" flag tagged to each of the one or more data values already present in the memory 113 to "False". In an embodiment, if the one or more test scenarios 104 are not received by the receiving module 233 for the first time, then the one or more data values are not deemed to new as the one or more data values may be already present in the memory 113. Therefore, the "New" flag tagged to each of the one or more data values is set to "False". Further, the data value identifying module 237 proceeds to block 237*g*.

At block 237*g*, the data value identifying module 237 checks for a condition to see if one or more data values other than the one or more existing data values are present in the one or more data sources 103. If the one or more data values other than the one or more existing data values are present in the one or more data sources 103, then the data value identifying module 237 proceeds to block 237*h*. If the one or more data values other than the one or more existing data values are not present in the one or more data sources 103, then the data value identifying module 237 proceeds to block 237*i*.

At block 237*h*, the data value identifying module 237 downloads and receives the one or more data values other than the one or more existing data values corresponding to each of the one or more test parameters from the one or more data sources 103 and proceeds to block 237*j*.

At block 237*i*, the data value identifying module 237 receives the one or more data values corresponding to each of the one or more test parameters other than those that are already existed in the memory 113 from the user and proceeds to block 237*j*.

At block 237*j*, the data value identifying module 237 sets the "New" flag tagged with each of the one or more data values to "True" to indicate that the one or more data values received by the receiving module 233 are new. Further, the data value identifying module 237 sets the "Expected" flag tagged with each of the one or more data values that were already existing in the memory 113 and the newly received to "True" by default. In an embodiment, the user can set the "Expected" flag to "False" when needed. Further, the data value identifying module 237 receives the corresponding data criticality associated with each of the one or more data values from the one or more data sources 103 if the corresponding data criticality is present in the one or more data sources 103 and the user may modify the received data criticality, if required. Alternatively, if the corresponding data criticality is not present in the one or more data sources 103, the user provides the corresponding data criticality through the user interface 106.

Upon identifying the data values as illustrated above, the data value identifying module 237 stores the one or more data values in a first dataset.

Figure 2C:
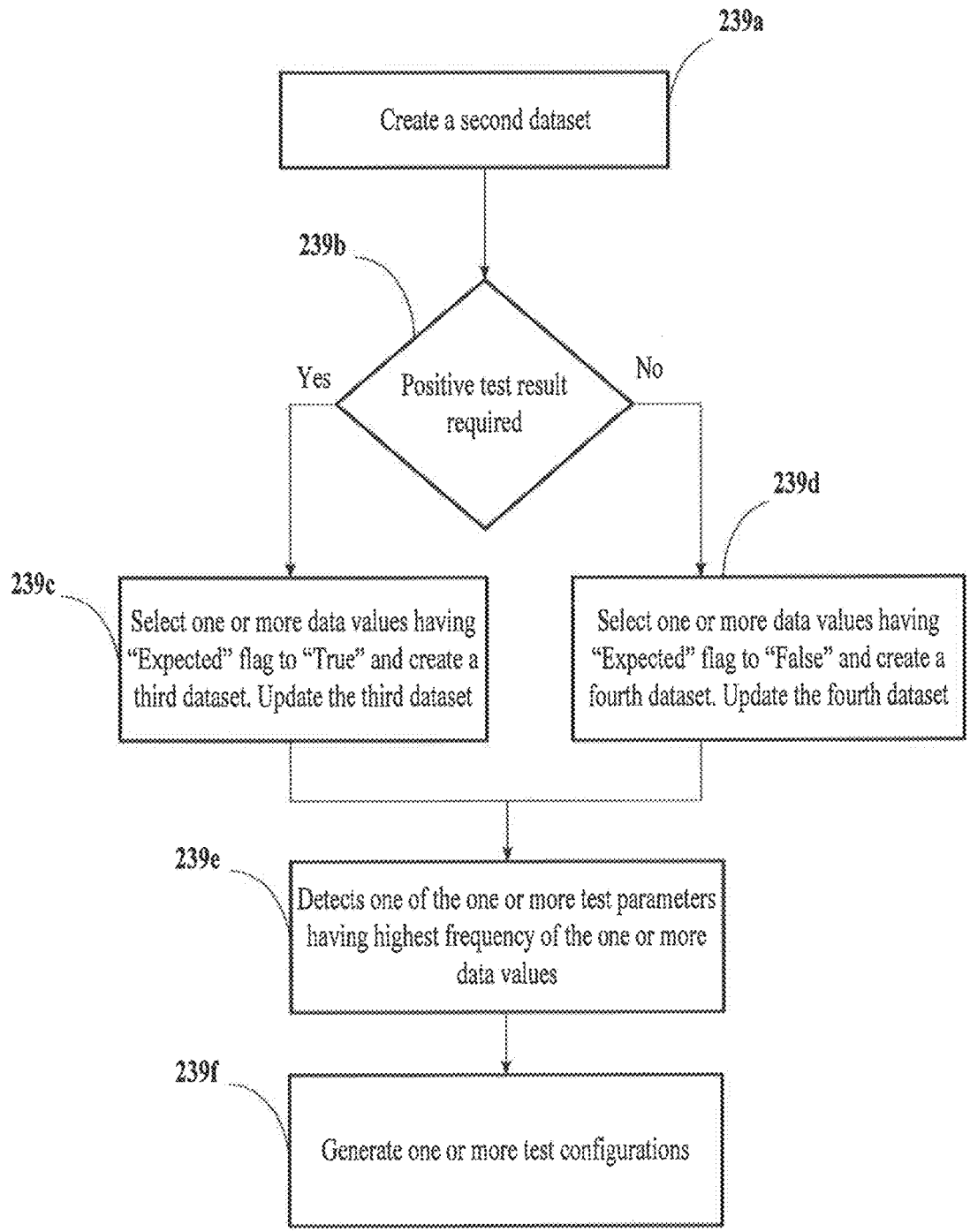
FIG. 2C shows a flowchart illustrating a method for generating one or more test configurations in accordance with some embodiments of the present disclosure.

In an embodiment, the test configuration generation module 239 generates the one or more test configurations based on the one or more test parameters, the corresponding requirement and the requirement criticality of each of the one or more test scenarios and each of the one or more data values corresponding to the one or more test parameters as illustrated in FIG. 2C.

At block 239*a*, the test configuration generation module 239 creates a second dataset. The second dataset is created by selecting the one or more data values corresponding to each of the one or more test parameters of each of the one or more test scenarios 104 from the first dataset based on the corresponding requirement criticality of each of the one or more test scenarios 104. In an embodiment, the test configuration generation module 239 selects the one or more data values associated with the data criticality "High", "Medium" and "Low" if the requirement criticality associated with the corresponding test scenario is "High". Further, the test configuration generation module 239 selects the one or more data values associated with the data criticality "High" and "Medium" if the requirement criticality associated with the corresponding test scenario is "Medium". Furthermore, the test configuration generation module 239 selects the one or more data values associated with the data criticality "High", if the requirement criticality associated with the corresponding test scenario is "Low". Upon creating the second dataset, the test configuration generation module 239 proceeds to block 239*b*.

At block 239*b*, the test configuration generation module 239 receives a type of test case flow from the user based on which the one or more data values are tested. In an embodiment, the type of the test case flow may be at least one of a positive flow or a negative flow. As an example, consider a test parameter "Credentials". When valid credentials are used to test the test case, then the purpose of the test case is checked for positive flow, when invalid credentials are used to test the test case, then the purpose of the test case is checked for negative flow. In an embodiment, if the type of the test case flow received from the user is a positive flow, then the test configuration generation module 239 proceeds to block 239c. In another embodiment, if the type of the test case flow received from the user is a negative flow, then the test configuration generation module 239 proceeds to block 239d. If the user wants to test for both positive flow and the negative flow, the test configuration generation module 239 first proceeds to block 239c and then to block 239d and finally combines the positive flow and the negative flow.

At block 239c, the test configuration generation module 239 selects the one or more data values having the "Expected" flag set to "True" from the second dataset and creates a third dataset. Further, the test configuration generation module 239 retrieves each of the one or more data values having the "New" flag set to "True", if any, from the first dataset, irrespective of the data criticality associated with the one or more data values. Furthermore, the test configuration generation module 239 updates the third dataset with each of the one or more data values retrieved from the first dataset and proceeds to block 239e.

At block 239d, the test configuration generation module 239 selects the one or more data values having the "Expected" flag set to "False" from the second dataset and creates a fourth dataset. Further, the test configuration generation module 239 retrieves each of the one or more data values having the "New" flag set to "True", if any, from the first dataset, irrespective of the data criticality associated with the one or more data values. Furthermore, the test configuration generation module 239 updates the fourth dataset with each of the one or more data values retrieved from the first dataset and proceeds to block 239e.

At block 239e, the test configuration generation module 239 detects one of the one or more test parameters having highest frequency of the corresponding one or more data values from the first dataset. Upon detecting the one of the one or more test parameters, the test configuration module 239 proceeds to block 239f.

At block 239f, the test configuration generation module 239 generates the one or more test configurations equal to the highest frequency based on at least one of the third dataset and the fourth dataset. As an example, if the highest frequency detected is 5, then the number of test configurations generated would be 5. The test configuration generation module 239 generates number of rows equal to the highest frequency and inserts the one or more data values identified for each of the one or more parameters in order of their occurrence. In an embodiment, if the number of one or more data values for any test parameter is less than the highest frequency, then the one or more data values shall be repeated and inserted in the rows until all the rows are complete.

In a non-limiting embodiment, the present disclosure may comprise plurality of datasets and not just first dataset, second dataset, third dataset and fourth dataset.

Figure 2D:
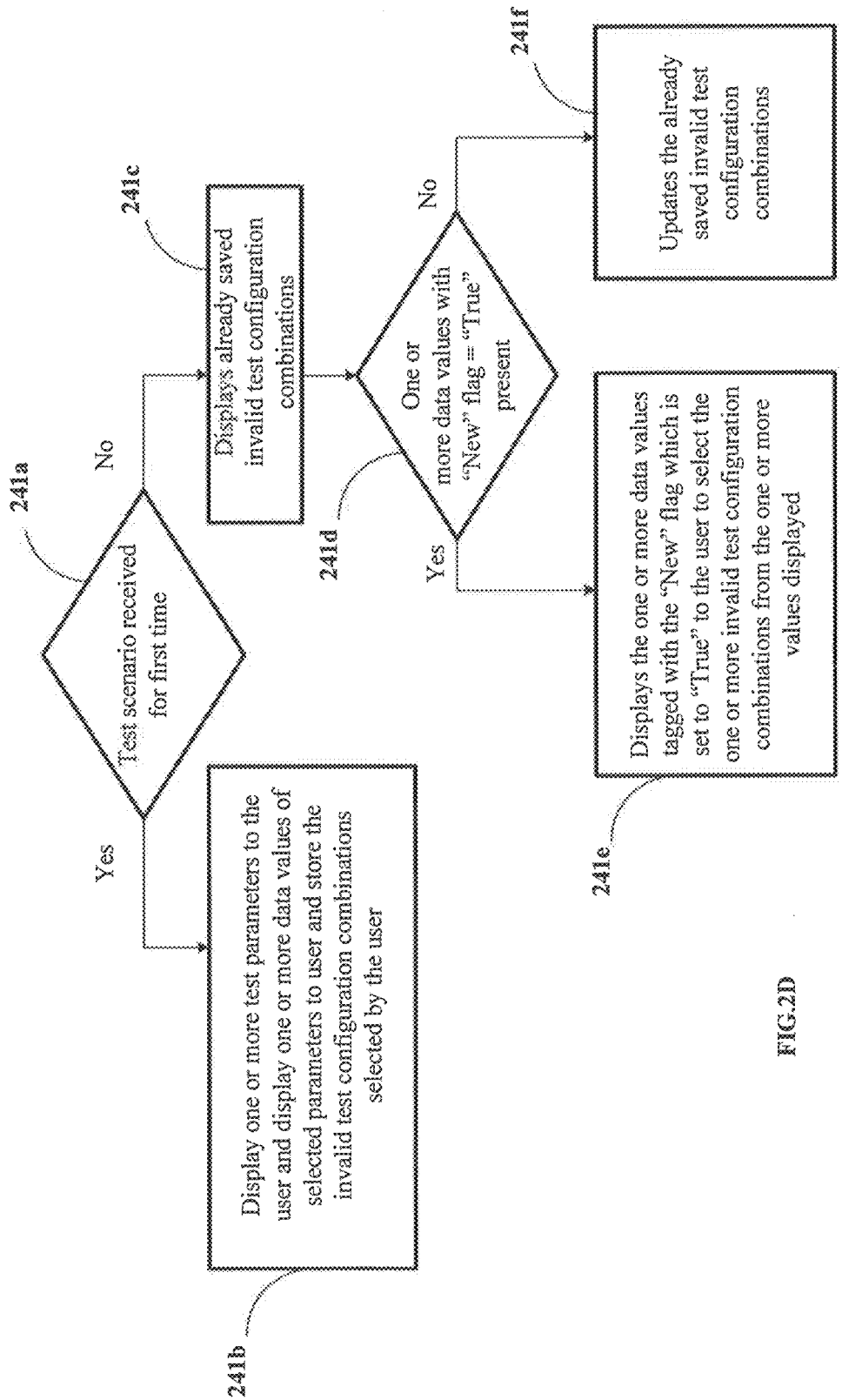
FIG. 2D shows a flowchart illustrating a method for selecting one or more invalid test configuration combinations in accordance with some embodiments of the present disclosure.

In an embodiment, the detection module 241 detects presence of the one or more invalid test configuration combinations from the one or more test configurations generated by the test configuration generation module 239. The one or more invalid test configuration combinations are selected and stored in the memory 113 based on inputs received from the user as illustrated in the FIG. 2D.

At block 241a, the processor 109 checks for a condition to see if the one or more test scenarios 104 are received for a first time. If the one or more test scenarios 104 are received for a first time, the method proceeds to block 241b via "Yes".

If the one or more test scenarios 104 are not received for a first time, the method proceeds to block 241c via "No".

At block 241b, the processor 109 displays each of the one or more test parameters to the user among which the user selects the one or more test parameters. Further, the processor 109 displays the data values associated with the one or more test parameters selected by the user.

Based on the one or more data values displayed, the user selects the one or more invalid test configuration combinations and the processor 109 stores the selected invalid test configuration combinations in the memory 113.

At block 241c, the processor 109 displays already saved invalid test configuration combinations to the user.

At block 241d, the processor 109 checks for a condition to see if the one or more data values tagged with the "New" flag which is set to "True" are present. If the one or more data values tagged with the "New" flag which is set to "True" are present, the method proceeds to block 241e via "Yes". If the one or more data values tagged with the "New" flag which is set to "True" are not present, the method proceeds to block 241f via "No".

At block 241e, the processor 109 displays the one or more data values tagged with the "New" flag which is set to "True" to the user. The user selects the one or more invalid test configuration combinations from the one or more values displayed. The processor 109 saves the one or more invalid test configuration combinations selected by the user in the memory 113 along with the already saved invalid test configuration combinations.

At block 241f, the processor 109 updates the already saved invalid test configuration combinations if needed.

The detection module 241 detecting the presence of the one or more invalid test configuration combinations by correlating the one or more test parameters selected by the user and each of the one or more data values corresponding to the one or more test parameters i.e. each of the one or more test configurations generated are compared with each of the one or more invalid test configuration combinations. If the one or more test configurations generated match with any of the one or more invalid test configuration combinations, the detection module 241 detects and categorizes that test configuration as the invalid test configuration combination.

In an embodiment, the replacement module 243 replaces the detected one or more invalid test configuration combinations from the one or more test configurations with a valid test configuration combination. Upon replacing all the detected one or more invalid test configuration combinations, a valid set of test configurations for each of the one or more test scenarios 104 remain, thus generating a valid set of one or more test configurations.

Scenario

Consider a test scenario for insurance policy creation for which a positive flow is required. The test scenario is received from the one or more data sources 103. The test scenario for insurance policy creation is associated with a Requirement 1 and a requirement criticality "High". The requirement 1 may include, but not limited to, requirements such as prompting user login and enter details and generating an insurance quote based on the details provided by the user. The one or more test parameters retrieved from the test scenario by parsing the test scenario are as shown in the below Table 2.

TABLE 2

Test Parameters

Uniform Resource Locator (URL)
Credentials
Customer_Type
Smoker Status
Product_Type The user may login and test the test scenario in multiple test environments. "URL" is the test parameter that holds links for the various test environments such as System Testing (SIT), User Acceptance testing (UAT) etc. Similarly, "Credentials" is the test parameter that holds data related to valid and invalid credentials used for logging in. Further, "Customer_Type" is the parameter that holds data related to different types of customers. "Smoker status" is a test parameter that holds data that specifies smoking status of the user. "Product type" holds data related to type of product that the user can choose from.

Further, one or more data values are identified for each of the one or more test parameters in Table 2. The one or more data values identified for each of the one or more test parameters along with corresponding data criticality of each of the one or more test parameters and the tagged flags are as shown in the below Table 3.

TABLE 3

| Test Parameter | Data Value | Data Criticality | "Expected" Flag | "New" Flag |
|---|---|---|---|---|
| URL | SIT URL | Medium | TRUE | FALSE |
| URL | UAT URL | Medium | TRUE | TRUE |
| URL | Pre-Product URL | Medium | TRUE | FALSE |
| Credentials | Valid Credentials | High | TRUE | FALSE |
| Credentials | Invalid Credentials | Medium | FALSE | FALSE |
| Customer_Type | Individual | High | TRUE | FALSE |
| Customer_Type | Group | Low | FALSE | FALSE |
| Smoker Status | Smoker | High | TRUE | FALSE |
| Smoker Status | Non Smoker | Medium | TRUE | FALSE |
| Product_Type | Term Life | High | TRUE | FALSE |
| Product_Type | Whole of Life | Medium | TRUE | TRUE |
| Product_Type | Extended Hospital Care | Medium | TRUE | FALSE |
| Product_Type | Universal Life | High | TRUE | FALSE |
| Product_Type | Annuity | Low | TRUE | FALSE |

The above Table 3 is considered as the first dataset of the test scenario.

Further, each of the one or more test parameters and each of the corresponding one or more data values are displayed to the user. The user selects the one or more invalid test configuration combinations, if any and the one or more invalid test configuration combinations selected by the user are stored in the memory 113. The invalid test configuration combinations identified by the user for the test scenario are as shown in the below Table 4.

TABLE 4

| Customer_Type | DOB | Smoker Status |
|---|---|---|
| Group | 25-30 years of age | |
| Group | | |
| Group | | Non Smoker |

As shown in the above Table 4, the data value "Group" of the test parameter "Customer_type" and the data value "25-30 years of age" of a test parameter "DOB" is an invalid test configuration combination. Similarly, the data value "Group" of the test parameter "Customer_type" and the data value "Non-smoker" of the test parameter "Smoker status" is an invalid test configuration combination.

Further, the second dataset is created based on the requirement criticality of the test scenario. Since the requirement criticality of the test scenario is "High", each of the corresponding one or more data values with data criticality "High", "Medium" and "Low" are selected from the first dataset to create the second dataset. Therefore, for the test scenario, each of the one or more data values present in the first dataset are selected and the second dataset is created i.e. the first dataset and the second dataset are the same for this test scenario since the requirement criticality is "High". Furthermore, the user selects the type of the test case flow as the positive flow. Therefore, the third dataset is created by selecting each of the one or more data values tagged with the "Expected" flag which is set as "True" from the second dataset. Upon creating the third dataset, each of the one or more data values tagged with "New" flag which is set as "True", irrespective of the data criticality are identified from the first dataset and added to the third dataset. The third dataset is updated with each of the identified one or more data values. Furthermore, one of the one or more test parameters having the highest frequency of the one or more data values is detected from the first dataset. One of the one or more test parameters with the highest frequency of the one or more data values in the test scenario is "Product_type" with frequency "5". Therefore, number of the one or more test configurations being generated is 5 as shown in the below Table 5.

TABLE 5

| Test Configuration Number | URL | Credentials | Smoker Status | Customer_Type | Product_Type |
|---|---|---|---|---|---|
| 1 | SIT | Valid | Smoker | Individual | Term Life |
| 2 | UAT | Valid | Non Smoker | Group | Whole of Life |
| 3 | Pre-Prod | Valid | Smoker | Individual | Extended Hospital Care |
| 4 | SIT | Valid | Non Smoker | Group | Universal Lite |
| 5 | UAT | Valid | Smoker | Individual | Annuity |

The one or more invalid test configuration combinations are detected from the generated one or more test configurations. Based on the Table 4, the data value "Group" of the test parameter "Customer_type" and the data value "Non-smoker" of the test parameter "Smoker status" is an invalid test configuration combination. Therefore, the invalid test configuration combination is replaced with a valid test configuration combination i.e. the data value "Non-smoker" of the test parameter "Smoker status" is replaced with the data value "Smoker". Therefore, the valid set of the one or more test configurations generated upon replacement is as shown in the below Table 6.

TABLE 6

| Test Configuration Number | URL | Credentials | Smoker Status | Customer_Type | Product_Type |
|---|---|---|---|---|---|
| 1 | SIT | Valid | Smoker | Individual | Term Life |
| 2 | UAT | Valid | Smoker | Group | Whole of Life |
| 3 | Pre-Prod | Valid | Smoker | Individual | Extended Hospital Care |

TABLE 6-continued

| Test Configuration Number | URL | Credentials | Smoker Status | Customer_Type | Product_Type |
|---|---|---|---|---|---|
| 4 | SIT | Valid | Smoker | Group | Universal Life |
| 5 | UAT | Valid | Smoker | Individual | Annuity |

Figure 3:
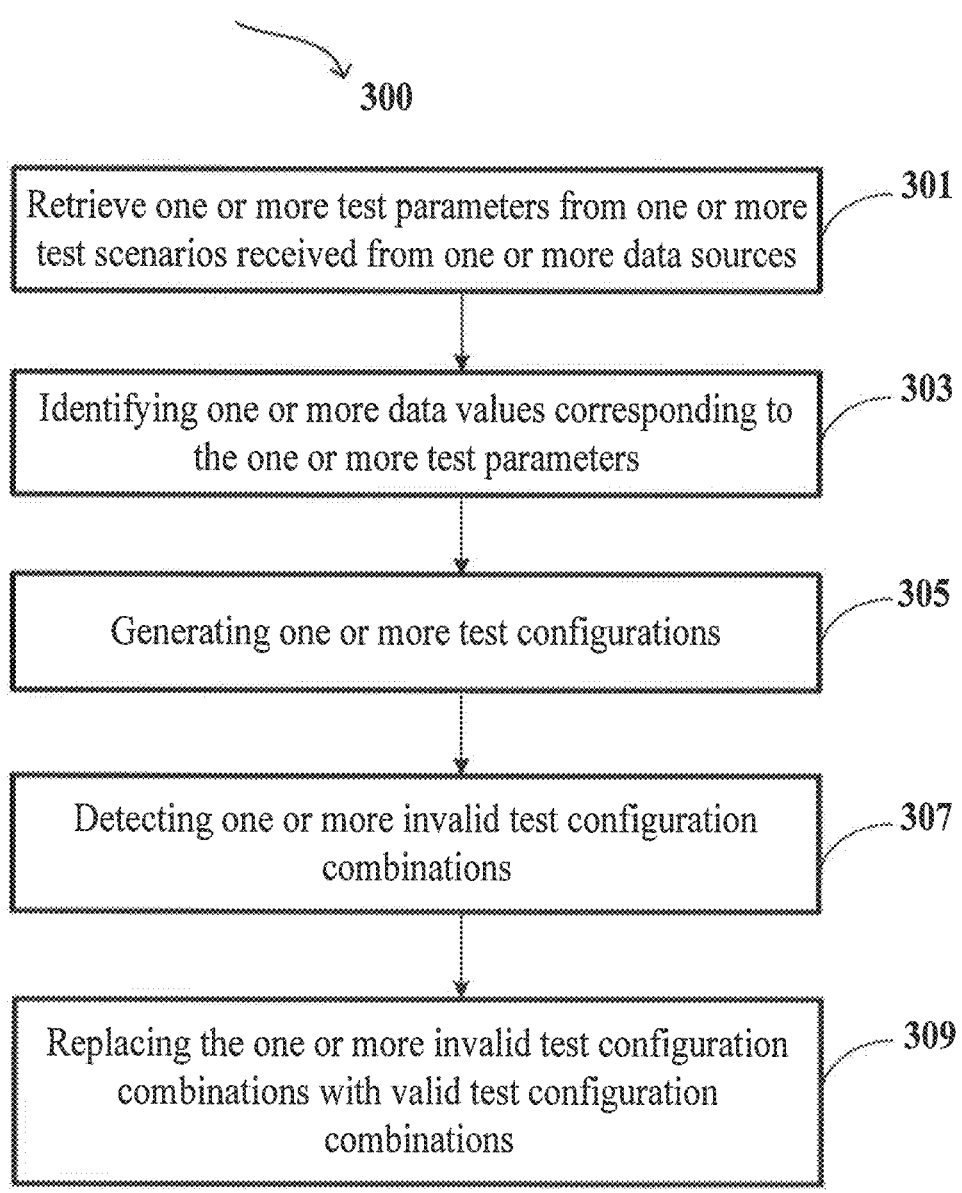
FIG. 3 shows a flowchart illustrating a method for generating a valid set of test configurations for test scenarios in accordance with some embodiments of the present disclosure.

FIG. 3 illustrates a flowchart showing a method for generating a valid set of test configurations for test scenarios in accordance with some embodiments of the present disclosure.

As illustrated in FIG. 3, the method 300 comprises one or more blocks illustrating a method for generating a valid set of test configurations for test scenarios 104. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the one or more test scenarios 104 are received from the one or more data sources 103. The one or more data sources 103 may include, but not limited to, a test management system that comprises one or more test scenarios 104. A processor 109 of the test configuration generation system 107 retrieves the one or more test parameters from each of the one or more test scenarios 104 received by the test configuration generation system 107. The one or more test parameters are retrieved by parsing the one or more test scenarios 104.

At block 303, one or more data values corresponding to each of the one or more test scenarios 104 are identified. If the one or more data values corresponding to each of the one or more test parameters are present in the one or more data sources 103, then the one or more data values are received from the one or more data sources 103. If the one or more data values corresponding to each of the one or more test parameters are not present in the one or more data sources 103, then the one or more data values are provided by the user through a user interface 106. Further, if the one or more test scenarios 104 are received for the first time, then the one or more data values associated with the each of the one or more test parameters retrieved from the one or more test scenarios 104 are deemed to be new. Therefore, a "New" flag tagged with each of the one or more data values is set to "True" to indicate that the one or more data values are new. Further, an "Expected" flag tagged with each of the one or more data values is set to "True" by default. In an embodiment, the user can set the "Expected" flag to "False" when needed. Further, a corresponding data criticality associated with each of the one or more data values from the one or more data sources 103 is received if the corresponding data criticality is present in the one or more data sources 103. If the data criticality is not present in the one or more data sources 103, the user provides the corresponding data criticality through the user interface 106.

At block 305, the one or more test configurations are generated. The processor 109 generates the one or more test configurations based on the one or more test parameters, the corresponding requirement and the requirement criticality of each of the one or more test scenarios 104 and each of the one or more data values corresponding to the one or more test parameters.

At block 307, the one or more invalid test configuration combinations are detected. In an embodiment, the processor 109 detects the presence of the one or more invalid test configuration combinations by correlating the one or more test parameters selected by the user and each of the one or more data values corresponding to the one or more test parameters i.e. each of the one or more test configurations generated are compared with each of the one or more invalid test configuration combinations. If the one or more test configurations generated match with any of the one or more invalid test configuration combinations, the processor 109 detects and categorizes that test configuration as the invalid test configuration combination.

At block 309, the detected one or more invalid test configuration combinations are replaced with a valid test configuration combination. In an embodiment, the processor 109 replaces all the detected one or more invalid test configuration combinations and a valid set of test configurations for each of the one or more test scenarios 104 remain, thus generating a valid set of one or more test configurations.

Figure 4:
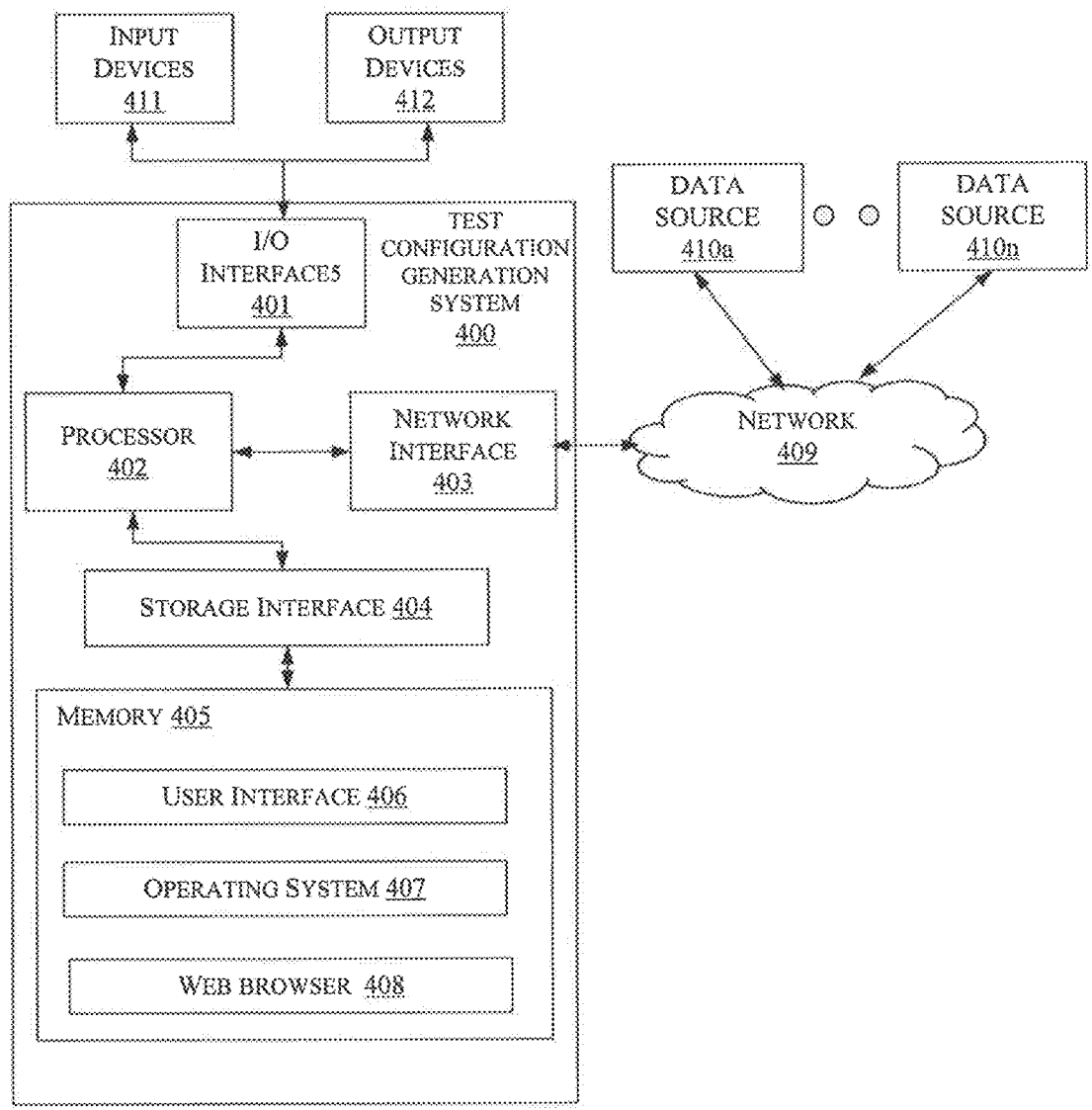
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the test configuration generation system 400 is used for generating a valid set of test configurations for test scenarios 104. The test configuration generation system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the test configuration generation system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T). Transmission Control Protocol/Internet Protocol (TCP/IP), token ring, IEEE 802.11a/b/g/n/x, etc. Using the network interface 403 and the communication network 409, the test case validation system 400 may communicate with one or more data sources 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, a test management system.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, the test configuration generation system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the test configuration generation system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/ 7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the test configuration generation system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the test configuration generation system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (I-TPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the test configuration generation system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the test configuration generation system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and a system for generating a valid set of test configurations for test scenarios.

The present disclosure provides a feature wherein the manual efforts required for generating the one or more test configurations is reduced by 80%.

The present disclosure provides a feature wherein right coverage with right set of configurations can be ensured, that can be executed within the limited time available The present disclosure provides a feature wherein the one or more test configurations are generated based on the requirement risk very efficiently which otherwise would include extensive manual efforts.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a valid set of test configurations for test scenarios. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 103 | One or more data sources |
| 104 | One or more test scenarios |
| 105 | Communication network |
| 106 | User interface |
| 107 | Test configuration generation system |
| 109 | Processor |
| 111 | I/O interface |
| 113 | Memory |
| 203 | Data |
| 205 | Modules |
| 206 | Requirement and requirement criticality data |
| 209 | Test parameter data |
| 211 | Data values and Data criticality |
| 213 | Flag data |
| 215 | Configuration combination data |
| 221 | Other data |
| 233 | Receiving module |
| 235 | Retrieving module |
| 237 | Data value identifying module |
| 239 | Test configuration generation module |
| 241 | Detection module |
| 243 | Replacement module |
| 245 | Other modules |

We claim:

1. A method for generating a valid set of test configurations for test scenarios, the method comprising:

retrieving, by a test configuration generation system, one or more test parameters from each of one or more test scenarios received from one or more data sources, wherein each of the one or more test scenarios is associated with a corresponding requirement and a requirement criticality;

identifying, by the test configuration generation system, one or more data values corresponding to each of the one or more test parameters and storing the one or more data values in a first dataset;

creating, by the test configuration generation system, a second dataset by selecting the one or more data values corresponding to each or the one or more test parameters of each of the one or more test scenarios from the first dataset based on the corresponding requirement criticality of each of the one or more test scenarios;

wherein creating the second dataset comprises:

selecting, by the test configuration generation system, each of the one or more data values associated with data criticality "High", "Medium" and "'Low", if the corresponding requirement criticality is "High";

selecting, by the test configuration generation system, each of the one or more data values associated with data criticality "High" and "Medium", if the corresponding requirement criticality is "Medium"; and selecting, by the test configuration generation system, each of the one or more data values associated with data criticality' "High", if the corresponding requirement criticality is "Low";

generating, by the test configuration generation system, one or more test configurations based on the one or more test parameters, the corresponding requirement and the requirement criticality of each of the one or more test scenarios and each of the one or more data values corresponding to the one or more test parameters;

detecting, by the test configuration generation system, one or more invalid test configuration combinations from the one or more test configurations by correlating the one or more test parameters selected by a user and each of the one or more data values corresponding to the one or more test parameters; and replacing, by the test configuration generation system, the one or more invalid test configuration combinations from the one or more test configurations with a valid test configuration combination to generate a valid set of test configurations for each of the one or more test scenarios.

2. The method as claimed in claim 1, wherein the requirement criticality is one of "High", "Medium" and "Low".

3. The method as claimed in claim 1, wherein each of the one or more data values is tagged with a flag comprising "New" flag and "Expected" flag.

4. The method as claimed in claim 3 further comprises setting, by the test configuration generation system the "New" flag to one of:
"True" if the one or more data values are provided to the test configuration generation system for a first time; and
"False" if the one or more data values are already available in the test configuration generation system.

5. The method as claimed in claim 3 further comprises setting, by the test configuration generation system, the "Expected" flag to one of:
"True" if the one or more data values are used for testing a positive flow; and
"False" if the one or more data values are used for testing a negative flow.

6. The method as claimed in claim 1, wherein each of the one or more data values is associated with a data criticality comprising one of "High", "Medium" and "Low".

7. The method as claimed in claim 1, wherein generating the one or more test configurations comprises:
receiving, by the test configuration generation system, a type of test case flow' from the user based on which the one or more data values are tested, wherein the type of the test case flow is at least one of a positive flow or a negative flow;
selecting, by the test configuration generation system, each of the one or more data values in the second dataset having:
"Expected" flag set to "True" if the type of test ease flow received is
the positive flow and storing in a third dataset; or
"Expected" flag set to "False" if the type of test case flow received is
the negative flow' and storing in a fourth dataset;
obtaining, by the test configuration generation system, the one or more data values having the "New" flag set to "True" from the first dataset if available in the first dataset for updating at least one of the third dataset or the fourth dataset based on the obtained one or more data values;
detecting, by the test configuration generation system, one of the one or more test parameters having highest frequency of the one or more data values from the first dataset; and
generating, by the test configuration generation system, the one or more test configurations equal to the highest frequency based on at least one of the third dataset and the fourth dataset.

8. The method as claimed in claim 1, wherein the invalid test configuration combinations are predefined by the user.

9. A test configuration generation system for generating a valid set of test configurations for test scenarios, the test configuration generation system comprising:
a processor; and
a memory communicatively coupled to the processor, wherein the memory stores the processor-executable instructions, which, on execution, causes the processor to:
retrieve one or more test parameters from each of one or more test scenarios received from one or more data sources, wherein each of the one or more test scenarios is associated with a corresponding requirement and a requirement criticality;
identify one or more data values corresponding to each of the one or more test parameters and storing the one or more data values in a first dataset;
create a second dataset by selecting the one or more data values corresponding to each of the one or more test parameters of each of the one or more test scenarios from the first dataset based on the corresponding requirement criticality of each of the one or more test scenarios;
wherein to create the second dataset, the instructions cause the processor to:
select each of the one or more data values associated with the data criticality "High", "Medium" and "Low", if the corresponding requirement criticality is "High";
select each of the one or more data values associated with the data criticality "High" and "Medium", if the corresponding requirement criticality is "Medium"; and
select each of the one or more data values associated with the data criticality "High", if the corresponding requirement criticality' is "Low":
generate one or more test configurations based on the one or more test parameters, the corresponding requirement and the requirement criticality of each of the one or more test scenarios and each of the one or more data values corresponding to the one or more test parameters;
detect one or more invalid test configuration combinations from the one or more test configurations by correlating the one or more test parameters selected by a user and each of the one or more data values corresponding to the one or more test parameters; and
replace the one or more invalid test configuration combinations from the one or more test configurations with a valid test configuration combination to generate a valid set of test configurations for each of the one or more test scenarios.

10. The test configuration generation system as claimed in claim 9, wherein the requirement criticality is one of "High", "Medium" and "Low".

11. The test configuration generation system as claimed in claim 9, wherein the processor tags each of the one or more data values with a flag comprising "New" flag and "Expected" flag.

12. The test configuration generation system as claimed in claim 11, wherein the processor further sets the "New" flag to one of:
"True" if the one or more data values are provided to the test configuration generation system for a first time; and
"False" if the one or more data values are already available in the test configuration generation system.

13. The test configuration generation system as claimed in claim 11, wherein the processor further sets the "Expected" flag to one of:
"True" if the one or more data values are used for testing a positive flow; and
"False" if the one or more data values are used for testing a negative flow.

14. The test configuration generation system as claimed in claim 9, wherein each of the one or more data values is associated with a data criticality comprising at least one of "High", "Medium" or "Low".

15. The test configuration generation system as claimed in claim 9, wherein to generate the one or more test, configurations, the instructions cause the processor to:

receive a type of test case flow' from the user based on which the one or more data values are tested, wherein the type of the test case flow is at least one of a positive flow or a negative flow;

select each of the one or more data values in the second dataset having:
- "Expected" flag set to "True" if the type of test case flow' received is the positive flow and storing in a third dataset; or
- "Expected" flag set to "False" if the type of test case flow received is the negative flow and storing in a fourth dataset;

obtain the one or more data values having the "New" flag set to "True" from the first dataset if available in the first dataset for updating at least one of the third dataset or the fourth dataset based on the obtained one or more data values;

detect one of the one or more test parameters having highest frequency of the one or more data values from the first dataset; and generate the one or more test configurations equal to the highest frequency based on at least one of the third dataset and the fourth dataset.

16. The test configuration generation system as claimed in claim 9, wherein the invalid test configuration combinations are predefined by the user.

17. A non-transitory computer-readable medium storing instructions for generating a valid set of test configurations for test scenarios, wherein upon execution of the instructions by one or more processors, the processors perform operations comprising:

retrieving one or more test parameters from each of one or more test scenarios received from one or more data sources, wherein each of the one or more test scenarios is associated with a corresponding requirement and a requirement criticality;

identifying one or more data values corresponding to each of the one or more test parameters and storing the one or more data values in a first dataset;

creating a second dataset by selecting the one or more data values corresponding to each of the one or more test parameters of each of the one or more test scenarios from the first dataset based on the corresponding requirement criticality of each of the one or more test scenarios;

wherein to create the second dataset, the instructions cause the processor to:
- select each of the one or more data values associated with the data criticality "High", "Medium" and "Low", if the corresponding requirement criticality is "High";
- select each of the one or more data values associated with the data criticality "High" and "Medium", if the corresponding requirement criticality is "Medium"; and
- select each of the one or more data values associated with the data criticality "High", if the corresponding requirement criticality is "Low";

generating one or more test configurations based on the one or more test parameters, the corresponding requirement and the requirement criticality of each of the one or more test scenarios and each of the one or more data values corresponding to the one or more test parameters;

detecting one or more invalid test configuration combinations from the one or more test configurations by correlating the one or more test parameters selected by a user and each of the one or more data values corresponding to the one or more test parameters; and replacing the one or more invalid test configuration combinations from the one or more test configurations with a valid test configuration combination to generate a valid set of test configurations for each of the one or more test scenarios.

18. The medium as claimed in claim 17, wherein to generate the one or more test configurations, the instructions cause the processor to:

receive a type of test ease flow from the user based on which the one or more data values are tested, wherein the type of the test case flow is at least one of a positive flow or a negative flow;

select each of the one or more data values in the second dataset having:
- "Expected" flag set to "True" if the type of test case flow received is the positive flow and storing in a third dataset; or
- "Expected" flag set to "False" if the type of test case flow received is the negative flow' and storing in a fourth dataset;

obtain the one or more data values having the "New" flag set to "True" from the first dataset if available in the first dataset for updating at least one of the third dataset or the fourth dataset based on the obtained one or more data values;

detect one of the one or more test parameters having highest frequency of the one or more data values from the first dataset; and generate the one or more test configurations equal to the highest frequency based on at least one of the third dataset and the fourth dataset.

* * * * *

UNITED STATES PATENT AND TRADEMARK OFFICE
CERTIFICATE OF CORRECTION

PATENT NO. : 9,858,175 B1
APPLICATION NO. : 15/356715
DATED : January 2, 2018
INVENTOR(S) : Girish Raghavan et al.

Page 1 of 1

It is certified that error appears in the above-identified patent and that said Letters Patent is hereby corrected as shown below:

In the Claims

Claim 1, Column 20, Line 37, --"'Low",-- should read as --"Low",--.

Claim 7, Column 21, Line 25, --flow'-- should read as --flow--.

Claim 7, Column 21, Line 32, --ease-- should read as --case--.

Claim 7, Column 21, Line 38, --flow'-- should read as --flow--.

Claim 9, Column 22, Line 23, --criticality'-- should read as --criticality--.

Claim 15, Column 23, Line 1, --flow'-- should read as --flow--.

Claim 18, Column 23, Line 26, --ease-- should read as --case--.

Claim 18, Column 23, Line 37, --flow'-- should read as --flow--.

Signed and Sealed this
Eighth Day of May, 2018

Andrei Iancu
*Director of the United States Patent and Trademark Office*